United States Patent [19]
Gatto et al.

[11] 3,771,393
[45] Nov. 13, 1973

[54] CUTTING APPARATUS AND METHOD THEREFOR

[75] Inventors: Charles Gatto, Bethpage; Harry M. Steinbach, Middle Village, both of N.Y.

[73] Assignee: Charles Gatto, Bethpage, N.Y.

[22] Filed: June 23, 1971

[21] Appl. No.: 155,857

[52] U.S. Cl. ................................. 82/53.1
[51] Int. Cl. ............................. B23b 5/14
[58] Field of Search ............................. 82/53.1, 4 C

[56] References Cited
UNITED STATES PATENTS
2,842,238    7/1958    Shaw et al. .................... 82/4 C X
FOREIGN PATENTS OR APPLICATIONS
907,969    10/1962    Great Britain .................... 82/53.1
970,752    9/1964    Great Britain .................... 82/53.1

*Primary Examiner*—Leonidas Vlachos
*Attorney*—Jerome Bauer et al.

[57] ABSTRACT

A cutting apparatus and method therefor, more particularly for cutting pipe and wherein the apparatus has cutting means to cut a desired length of moving pipe by moving the cutting means with the pipe and rotating the same about the pipe during the cutting operation. The apparatus and method also includes the rotation and movement of associated fluid and electrical operators for and with the cutting means to operate the same and produce fluid for the fluid operator by receiving actuating electricity from a conventional non-rotating source.

18 Claims, 10 Drawing Figures

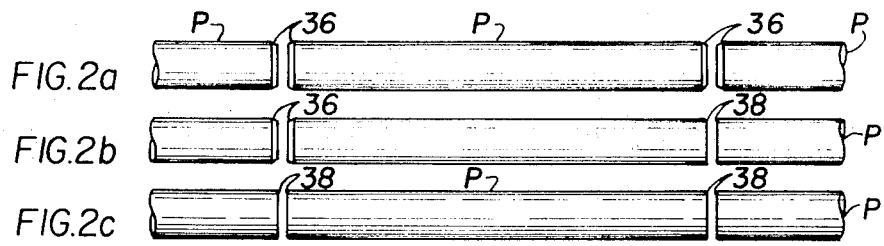
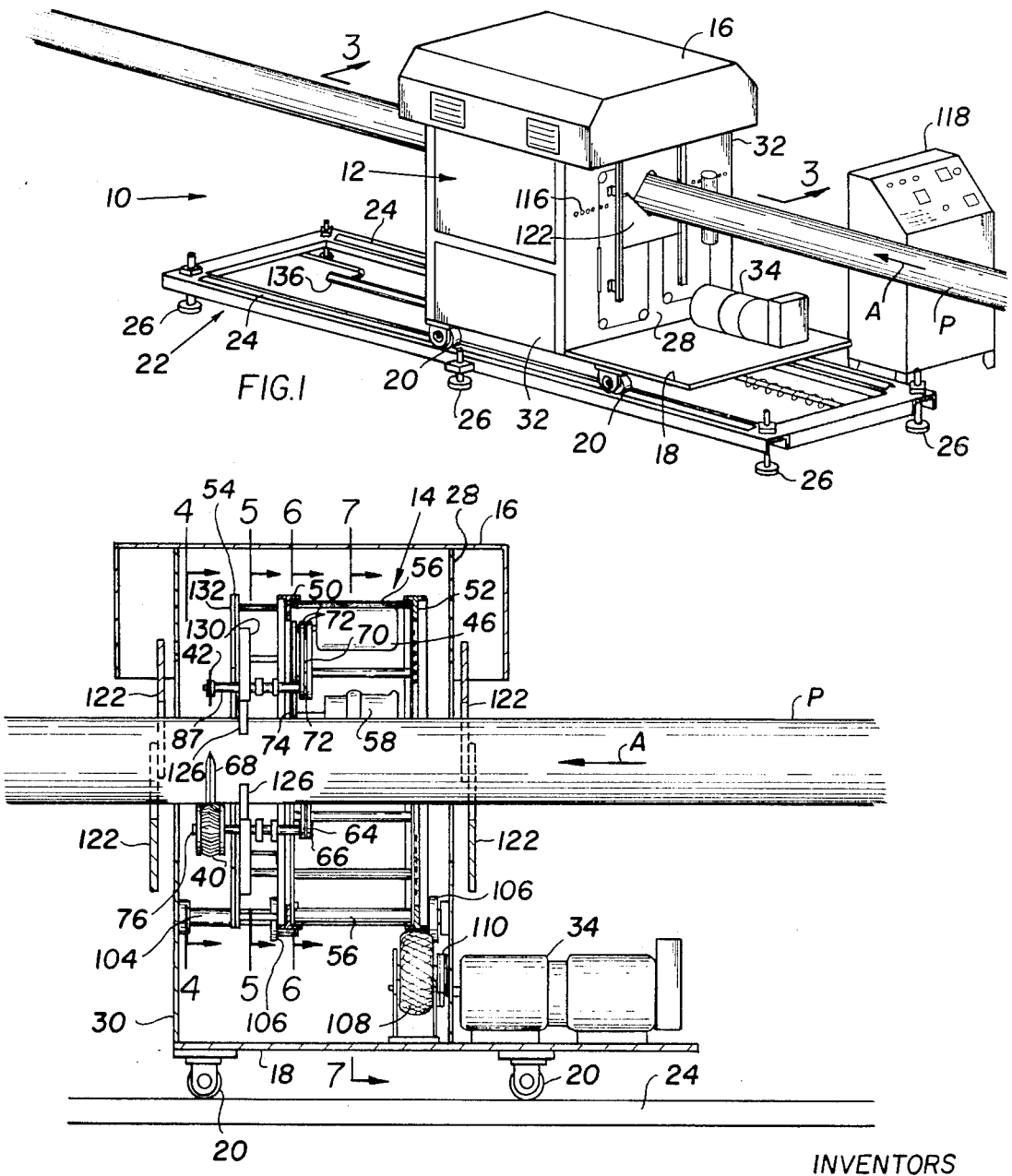

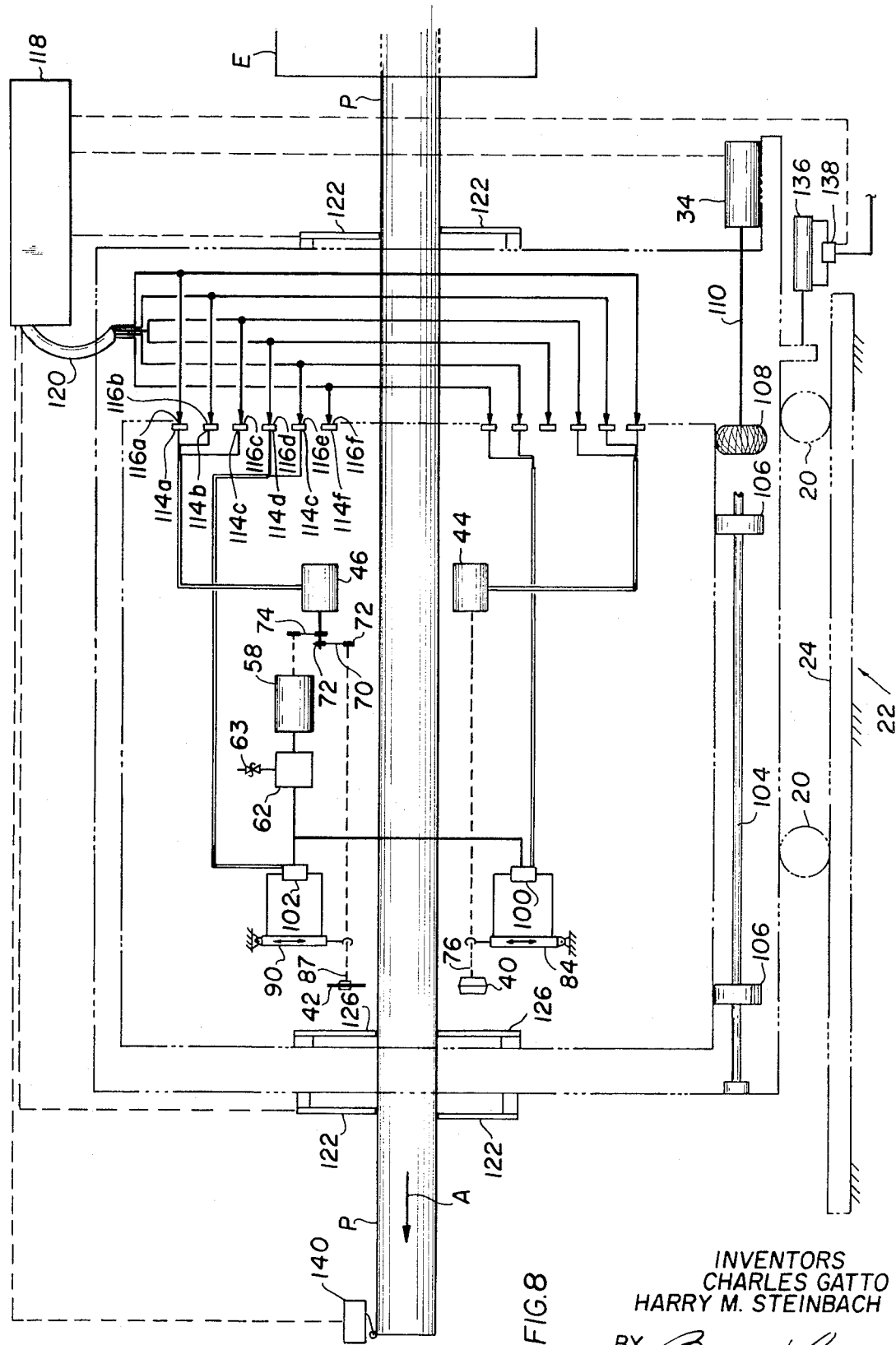

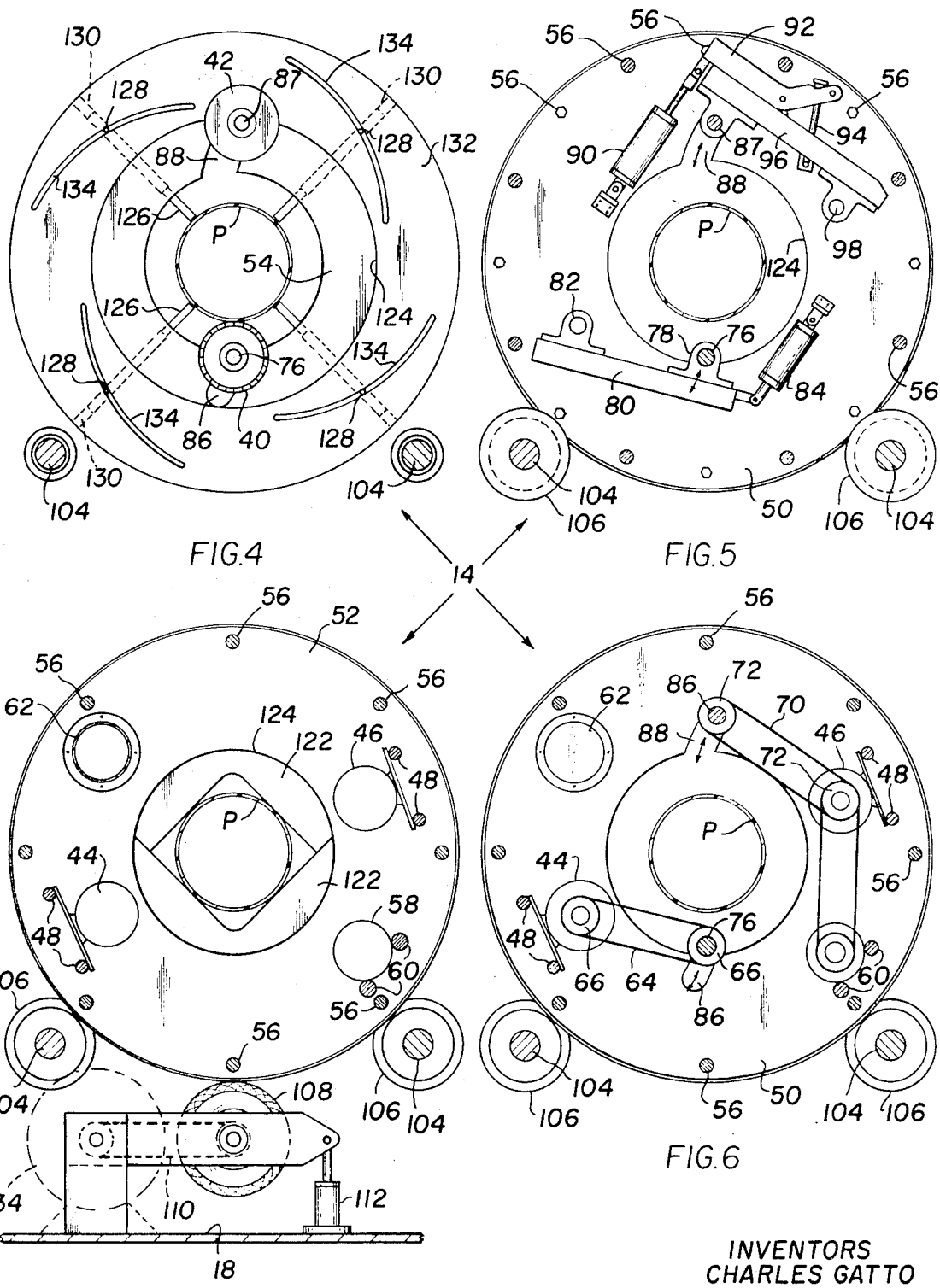

CUTTING APPARATUS AND METHOD THEREFOR

BACKGROUND OF THE INVENTION

This invention relates to cutting apparatuses and to the method of operating the same. More particularly, it is related to the solution of the problem of cutting desired lengths of newly extruded plastic pipe and of the milling to chamfer or bevel the cut ends thereof in the event the same is desired.

With the advent of low cost, high speed continuous production of extruded plastic pipe of relatively large diameters, it has become necessary to devise automatic apparatuses that will cut the pipe into shorter selected lengths without stopping, slowing or otherwise interfering with the extrusion process. Attempts in the past to utilize automatic cutting apparatuses have met with failure because of the inability to include on such apparatus all of the cutting elements and the related structures necessary to operate the same.

In the past, automatic cutting apparatuses have included a carriage movable along a track in timed movement with the movement of the pipe being extruded. In such prior apparatuses, the cutters were operated into and out of cutting positions by fluid operated mechanisms receiving either hydraulic or pneumatic fluid from a stationary source of supply as a compressor that was connected by conduit to a rotating drum on which the cutting elements and their operators were mounted. In so attempting to convey and supply the actuating fluids to the fluid operators for the cutters, it was necessary to provide extremely accurate and precise connections between the fluid operators on the rotating drum and the conduits of the fluid source. Any relative misalignment in such connections resulted in the spillage and loss of necessary operating fluid with the consequent failure and malfunction of the fluid operators and the apparatus.

SUMMARY OF THE INVENTION

The present invention recognizes these problems of the prior art and overcomes the same by eliminating their root source. The desideratum of this invention is to provide a cutting apparatus in which all of the cutting and necessary related operating structures are mounted directly on a member that rotates about the workpiece to be cut. To this end, the invention obviates the need for the careful, precise or accurate alignment of operating structures and fluid connections as was required in the prior art and, therefore, results in an apparatus that is efficient, compact and free of the failures and malfunctions of the apparatuses used heretofore.

More particularly, by mounting the cutting and necessary operating structures directly on the rotating member, the same may be easily balanced and simply supplied with operating electricity from any convenient source. Further, by placing all of the fluid supply and reservoir structures directly on and rotating with the rotating member for movement therewith, the problems of precise starting and stopping positions required in prior art apparatuses in order to align fluid supply conduits with fluid receiving openings on the drum also have been obviated.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings, wherein:

BRIEF DESCRIPTION OF THE DRAWINGS

FIG. 1 is a perspective view of the cutting apparatus constructed according to the invention;

FIGS. 2a, b and c illustrate forms of cuts that may be performed on pipe according to the teaching of the invention;

FIG. 3 is a cross-section of FIG. 1 taken along lines 3—3;

FIG. 4 is a cross-section of FIG. 3 taken along lines 4—4;

FIG. 5 is a cross-section of FIG. 3 taken along lines 5—5;

FIG. 6 is a cross-section of FIG. 3 taken along lines 6—6;

FIG. 7 is a cross-section of FIG. 3 taken along lines 7—7; and

FIG. 8 is a diagrammatic illustration of the apparatus of FIG. 1.

Referring now to the drawings and more particularly to FIG. 1 thereof, the cutting apparatus there shown is generally identified by the numeral 10. Illustrated in FIG. 1 is a workpiece or pipe P that moves in the direction of the arrow "A" and shows the same as though it had just been formed and extruded from a plastic pipe extruding machine E (FIG. 8). The workpiece pipe P moves in the direction of its axis away from the forming or extruding machine toward the cutting apparatus 10. The cutting apparatus 10 includes a carriage generally identified by the numeral 12 having within it a drum structure that is generally identified by the numeral 14. Both the carriage 12 and the drum 14 have axially aligned openings which permit the passage of the pipe P through the carriage and the drum for the subsequent performance of cutting operations on the pipe.

The carriage 12 is a generally closed housing having a cover 16 and a base 18. The base 18 includes a plurality of at least four wheels 20 extending downward from the underside thereof to support the carriage 12 and the drum 14 for movement with the pipe in the direction of its axis and for reciprocal return movement after the cutting operation on the pipe has been completed. The movement of the carriage is directed and guided along a track structure generally identified by the numeral 22.

The track structure is of open form construction having guide tracks 24 extending longitudinally along opposite upper surfaces thereof. The two laterally spaced guides 24 contain the opposite sets of wheels 20 on the underside of the carriage 12 to guide the carriage along the length of the track structure 22. The track structure 22 may be mounted level on any surface by adjustment of corner and intermediate leveling feet 26. The length of track structure 22 and the lengthwise extent of the guides 24 depend upon the available room within the area in which the cutting apparatus 10 is to operate as well as upon other factors such as the length of the workpiece pipe to be cut.

The carriage 10 has a front 28, a rear 30, and opposite sides 32 which enclose the same and thereby prevent accidental damage to surrounding equipment or personnel during its operation. The carriage housing utilizes or is mounted on only a portion of the base or platform 18 such that there is additional space on which a drum operating motor 34 may be mounted.

The enclosed carriage 12 houses and mounts the rotatable drum 14 which includes at least one or more cutting elements. In this regard, reference is now made in particular to FIGS. 2a, b and c. FIG. 2a illustrates the workpiece P with the same severed along lengths thereof and with each of the severed ends having chamfered or beveled ends 36. FIG. 2b illustrates a similar workpiece pipe P wherein one of the ends is chamfered at 36 while the opposite end has a straight cut 38. In FIG. 2c, the pipe there shown may be severed into lengths wherein each of the ends may have similar straight cuts 38. Thus, it will be clear from the illustrations in FIGS. 2a, b and c that the ends of each length of workpiece or pipe cut from the continuous pipe P may be provided selectively and predeterminately with straight cut ends 38 or chamfered ends 36 or with a combination thereof wherein one of the ends of the pipe may have a chamfer 36 while the other end may have a straight cut 38.

In order to accomplish the aforementioned chamfer and straight end cuts on the pipe P, the present invention has one or more cutting elements. The chamfer end 36 is formed by a beveled mill cutter 40 while the straight cut end 38 is preformed by a saw blade 42. Each of the cutting elements 40 and 42 is adapted to be rotated about its own axis by a respective drive motor 44 and 46 shown more clearly in FIGS. 6, 7 and 8. Each drive motor 44 and 46 is conveniently mounted fixedly on the drum 14, as on connecting rods 48 secured between relatively axially spaced plates 50 and 52 forming a part of the drum structure.

The drum 14 comprises a plurality of relatively axially spaced plates which include the intermediate plate 50, the forward plate 52 and the rear plate 54. These three plates are secured together in relative axial spaced relationship by a plurality of axially extending connecting rods 56. The space between the intermediate plate 50 and the forward end plate 52 is greater than that between the plate 50 and the rear plate 54 so as to accommodate the drive motors 44 and 46 between them. This space also accommodates a fluid compressor 58 mounted to the drum at mounting rods 60 and a fluid reservoir 62 conveniently mounted on the drum 14 between the plates 50 and 52. The fluid compressor 58 and reservoir 62 may be utilized for the purpose of providing operating fluids such as hydraulic or pneumatic fluids. However, for the convenience of the present disclosure, the fluids to be discussed will be gaseous or pneumatic.

The drive motor 44 is connected by a belt and pulley 64 and 66 (FIG. 6) to drive and rotate the mill cutter 40. The cutter 40 is provided with a plurality of blades spaced about the periphery thereof with each blade directed angularly from an apex so that as the same engages the surface of a workpiece, as the pipe P, it initially forms a V-shaped or chamfering cut into the surface of the pipe such that a double bevel or chamfer is formed. This is shown more clearly in FIG. 3 wherein the cut 68 formed by the apex of the milling cutter 40 has an initial V-shape which deepens as the cut progresses about the outer periphery of the pipe. The purpose of this cut and its manner of generation will be described later herein.

The saw cutting drive motor 46 is connected by a drive belt 70 and pulleys 72, one each on the motor 46 and on the cutter 42, to rotate the saw blade 42 about its axis in response to the operation of its drive motor 46. The drive motor 46 is similarly connected by a drive belt 74 to the fluid compressor 58 so as to operate the same in response to the operation of the motor 46.

Each of the plural cutters is actuated into and out of cutting position and cutting engagement with the workpiece P by a fluid operated cylinder which receives its supply of operating fluid from the reservoir 62 continually filled by the compressor 58. The milling cutter 40 has its pulley supporting shaft 76 rotatably mounted in a journal bearing 78 which forms a part of an actuating arm 80 pivotally mounted at 82 on the intermediate plate 50. Connected with the actuating arm 80 is a fluid operable double acting cylinder 84 that is swingably mounted at its opposite end to the plate 50. Both the plates 50 and 54 of the drum are provided with arcuately directed slots 86 which permit the swinging movement of the shaft 76 of the cutter radially about the pivot 82 toward and away from cutting engagement with the outer peripheral surface of the workpiece P.

Much the same arrangement of swinging movement of the saw blade 42 is provided for. The saw blade 42 is mounted on a rotatable shaft 87 which is adapted to move arcuately toward and away from the surface of the pipe P in an arcuate slot 88 provided in both the plates 50 and 54. This movement is effected through the operation of a double acting fluid cylinder 90 that is swingably connected to the plate 50 at its one end and pivotally mounted at its upper end to a link 92 that is joined by an adjustable rod 94 with an actuating arm 96 that is pivotally mounted at 98 on the plate 50. The operation of either double acting cylinder 84 or 90 causes the respective cutter means to move arcuately in their respective slots 86 or 88 toward and away from cutting engagement with the peripheral surface of the workpiece P. The depth of cut of the end cutter 42 may be adjusted by lengthening or shortening the extent of the connection between the link 92 and the actuating arm 96 at the adjustable rod 94.

Each double acting fluid operable cylinder 84 and 90 is connected by a fluid conduit with a double acting solenoid valve 100 and 102 respectively as seen more clearly in FIG. 8. The valves 100 and 102 receive their supply of fluid directly from the reservoir 62 which is supplied by the compressor 58 operated in turn by the operation of the motor 46.

Because of the drive belt and pulley connection between the motor 46 and the saw drive shaft 87 and the similar drive connection between the motor 44 and the chamfer cutter drive shaft 76, it is possible to permit the cutter elements to swing arcuately toward and away from cutting engagement with the workpiece while at the same time rotating the same about their respective axes by their motors. In the case of the drive motor 46, the same not only functions to rotatively operate the cutting element 42 but also to operate the compressor 58.

The drum 14 is mounted for reciprocal movement with the carriage 12 and for movement on the carriage 12 for rotation relative thereto and about the pipe or workpiece P. To enable this, the carriage is conveniently provided with supporting shafts 104 on which are mounted supporting rotatable wheels 106. The drum rolls and rotates freely and smoothly on the wheels 106 about the axis of the workpiece P and is driven in this rotation by a drum drive wheel 108 that is operated by the motor 34 mounted on the forward portion of the platform or base 18.

Rotation is imparted to the drum 14 by the roller 108 by a convenient connecting belt 110 and pulleys not numbered. When it is desired to drive the drum, the motor 34 is operated and the drive wheel 108 is moved into engagement with the outer surface of the drum by the operation of a fluid operated cylinder 112. When the plunger of the cylinder 112 is retracted, rotation of the drum is terminated, but when the cylinder is operated to move the wheel 108 up into engagement with the drum, the same is caused to rotate. Thus, it is possible to selectively control and predeterminately operate the rotation of the drum 14.

Mounted on the forward end plate 52 of the drum 14 are a plurality of annular electrical connecting slip rings. In the present disclosure, six such slip rings are shown. The slip rings are identified by the numeral 114 and each is connected with a respective input electrical brush 116 which, in turn, is connected with a source of electricity at an electrical console 118 by a flexible cable 120. The slip rings 114 have been conveniently identified by the subletters *a* to *f* as have the brush contacts 116. The electrical take-off slip rings 114 rotate with the drum 14 whereas the input electrical connecting brushes 116 are mounted fixedly on the carriage 12 and are connected with the source of electricity at the console 118 by the flexible cable 120. Similarly, the motor 34 for rotating the drum drive wheel 108 is connected by a flexible cable to the source of electricity at the console 118.

The carriage 12 includes a convenient workpiece clamping structure here shown in the nature of relatively vertically movable V-shaped blocks 122. The clamps 122 are provided at the forward and rearward faces of the carriage 12 each overlying a through opening in the carriage 12 aligning with a through axially aligned circular opening 124 provided in each of the plates of the drum 14. The operation of the clamps 122 forms no part of the disclosure of the present application and, therefore, the details of the same will not be elaborated upon.

An additional workpiece centering structure is provided on the drum 14 in the form of centering pins 126. In referring to FIG. 4, it will be seen that there are four such centering pins each of which is mounted on a guide bar 128 that moves radially within a sleeve 130 that is actuated radially into and out of the defines of the opening 124 of the drum by a rotatable plate 132 mounted to the inner face of the outer drum plate 54. When the plate 132 is rotated, it causes the guide bar 128 to ride within a respective slot 134 thereby positioning each of the centering pins 126 by moving the same radially with respect to the opening 124.

The carriage 12 and drum 14 are moved as a unit along the length of the track structure 22 in response to the operation of a double acting drive cylinder 136 mounted within the confines of the track structure 22. Operating fluid is supplied to the cylinder 136 by any convenient source for the selective actuation of the cylinder by the electrical operation of a double acting solenoid valve 138 (FIG. 8). The plunger of the cylinder 136 may be connected directly to the underside of the carriage 12 to cause the same to reciprocate lengthwise along the track structure 22 with the carriage being guided at its wheels 20 by the guides 24.

In operation, the workpiece or in the present case, inasmuch as the disclosure is related to the performance of cutting operations on a plastic pipe P being formed at an adjacent extruder E, the pipe leaves the extruder and moves in the direction of the arrow "A" as shown in FIGS. 1, 3 and 8. The carriage 12 and its related drum 14 are moved to a starting position at the extreme right of the track structure 22 to a position as closely adjacent to the extruder as possible. The clamping or holding means 122 are moved to their fully open position, a position directly opposite from that illustrated in the drawings so as to fully expose the through opening in the forward and rear walls 28 and 30 of the carriage and the through opening 124 in the plates of the drum 14. This permits the pipe P to move continuously and uninterruptedly from the extruder E to the point where it engages and actuates a trigger switch 140. The operation of the trigger switch 140 produces a signal in the console 118.

In the initial operation of the apparatus 10, the console 118 may be programmed to supply electrical current to the drum operating motor 34, thereby causing the rotation of the drum drive wheel 108 so that the same may be instantaneously ready to impart rotation to the drum 14. In like manner, current may be supplied to the input brushes 116a, b and c to cause the initial operation of the cutter motors 44 and 46 thereby resulting in the immediate rotation of the cutters 40 and 42 respectively. Hence, when the trigger switch 140 is caused to operate by the engagement of the forward end of the workpiece P moving through and beyond the apparatus 10, suitable electrical and conventional structures within the console are activated to operate the fluid cylinder 112 to raise the already rotating drum drive wheel 108 into engagement with the drum 14 to rotate the same within and relative to the carriage 12. Substantially simultaneously the clamp or holding elements 122 are automatically operated to their closed positions to fully engage about the workpiece P without distorting its shape and thereby clamping the pipe and the carriage together for conjoint movement in the direction A of the movement of the pipe.

The valve 138 to the carriage drive cylinder is similarly energized through the console 118 to direct operating fluid into the cylinder 136 to cause the carriage and its drum to move along the length of the track structure 22 at the same speed as the pipe P is being fed from the extruder E. It should be noted that the operation and setting of the centering structure pins 126 engaging about the surface of the pipe P may be performed and set initially to a diameter slightly in excess of that of the pipe P to remain so fixed until a pipe of a different diameter is to be cut, at which time the structure 126 will be reset so that the pipe P is held and centered within the rotating drum 14 and carriage 12, all of which now move conjointly.

As the carriage moves with the pipe and the drum is rotated about the periphery of the pipe by the drum drive wheel 108, the cutting operations are ready to be performed. If it is desirable to produce the cutting operation such as is shown in FIG. 2c wherein the ends of the pipe are provided with a straight cut, it is only necessary to actuate the rotating end cutter 42 into engagement with the pipe surface. This is accomplished by providing input electrical current from the source connected at the console 118 to the brushes 116 which are in constant electrical connection with their respective electrical take-offs or slip rings 114.

In order to initiate the operation of the already rotating cutter 42, the console will close suitable circuits to supply current to the brushes 116d and e electrically connected to operate the solenoid valve 102 to thereby supply actuating fluid from reservoir 62 to cause the double acting cylinder 90 to pivot the cutting element 42 into engagement with the periphery of the workpiece P. Inasmuch as the drum 14 is continuously rotating about the workpiece, as the cutting element 42 engages the outer periphery thereof, it performs a circular cut about the circumference of the workpiece P which becomes deeper as the saw orbits and moves progressively about the periphery of the workpiece until such time as it cuts completely through the workpiece. Thereafter, the further energization of the brushes 116d and e will cause a reversal of flow of fluid to the cylinder 90 retracting the rotating cutting element 42 from engagement with the pipe.

The clamps or holders 122 are then released and the severed or cut pipe is then deposited on a table located at the end of the travel of the carriage 12. The carriage then reverses its direction of movement along the track structure 22 by reversing the operation of the valve 138 to cause the reverse operation of the cylinder 136 and thereby returns the carriage for a new operation.

It must be recognized that all during the aforedescribed operation, the motor 46 is operated so as to cause the compressor 58 to supply operating fluid to the reservoir 62. Hence, there is always a ready supply of fluid for the operation of either the cylinder 90 or the cylinder 84. Overfilling of the reservoir 62 is prevented by providing an overflow release pressure valve 63. In addition, the drum 14 is self-contained in that none of the operating parts thereof requires any alignment with any exterior structure beyond the input brushes 116 mounted on the carriage body 12. Hence, the apparatus is completely self-contained.

Should it be desired to cut the workpiece P in the manner such as is shown in FIG. 2a, substantially the same sequence of steps may be performed except that the double beveled milling or chamfering cutter 40 is brought into operation prior to that of the straight edge cutter 42. In other words, with the carriage 12 moved to the most right hand starting position on the track structure 22 adjacent to the extruder E, the pipe P is permitted to enter the carriage and pass through the drum and exit beyond the rear end of the carriage until such time as it actuates the trigger switch 140.

As previously noted, on the start up of the apparatus prior to the entry of the pipe P into the carriage 12 thereof, the motor 34 will have already caused the rotation of the drum drive wheel 108. At the same time of start up, electricity will be supplied from the source at the console 118 to selected ones of the brushes 116 and hence to the respective receiving electrical take-off connections 114. As a consequence, both motors 44 and 46 will be operated and thus will rotate their respective cutters 40 and 42. Upon the operation of the motor 46, the compressor 58 will supply sufficient fluid to keep the resevoir 62 fully filled. Hence, when the workpiece P finally reaches the trigger switch 140 to initiate its operation, the apparatus 10 is fully ready to perform its cutting functions.

To produce the cut 36 on the workpiece P, the drum 14 is caused to rotate about the pipe by actuating the cylinder 112 to engage the wheel 108 of the drum to thereby rotate the same. At the same time, the solenoid valve 138 is operated to cause the cylinder 136 to move the carriage and rotating drum conjointly in timed relation with and in the direction of movement of the pipe P. Thereafter, electrical current is supplied to the brush contacts 116e and f which cause the consequent energization of the solenoid valve 100 to open the same to the fluid of the reservoir 62 and thereby cause the pivoting of the beveled mill or chamfering cutter 40 into engagement with the peripheral surface of the pipe P. The nature of the cut begins such as is shown at 68 in FIG. 3 and as the drum rotates about the pipe and the cutter 40 rotates about the axis of its shaft 76 and orbits about the workpiece, it makes a double sided bevel cut into the pipe.

After the cutter 40 has traversed a predetermined arc or distance about the periphery of the pipe P, the solenoid valve 102 of the end cutter 42 is actuated to admit fluid to the cylinder 90 and thereby actuate the cutter 42 into cutting engagement with the pipe P. The cutter element 42 engages the pipe at the apex or point of the double bevel cut performed by the cutter element 40 and consequently equally severs the pipe at the midpoint of the double-chamfer or double-bevel. Thus, it will be seen that the cut made by the element 42 follows that made by the element 40.

The timed sequence of these cuts may be varied depending upon the timer structure contained within the console 118. However, it is usually the practice to remove the chamfer cutter 40 from engagement with the pipe only after it has traversed at least a 360° path and cut in the workpiece by again actuating the valve 100 to reverse operate the cylinder 84 to retract the cutter 40 from engagement with the pipe. Thereafter, the cutter element 42 may be removed from engagement with the pipe after it has completed its full peripheral cut about the pipe to fully sever the same in the manner such as shown in 36 of FIGS. 2a and b. The cut length of pipe P is then released by the opening of the holding structure 122, deposited on a table or stack and the carriage is then returned to its starting position by the reverse energization of the valve 138 and operation of the cylinder 136. All during this time the continued functioning of the motor 46 causes the compressor to operate and keep the reservoir 62 fully supplied with fluid in preparation of a new cutting operation on the workpiece to be supplied it.

It will be recognized that the chamfer cuts made as shown at 36 in FIGS. 2a and 2b may also be combined with the straight edge cuts 38 such as shown at FIGS. 2b and 2c. The selection of the nature of the cut in the workpiece or pipe P is merely a matter of programming the console 118. Those skilled in the art will readily realize that because of its self-contained completeness, all that is neceSsary in the present invention is to provide a supply of electrical current from the stationary source such as is conveniently afforded at the console 118. Thereafter, the operative structural details of the cutting apparatus require no precision alignments as in the prior art and the parts function automatically in accordance with the preselection and programming at the console 118.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a cutting apparatus for a workpiece
a track,
a carriage,
means to move said carriage for reversible movement along said track,
support means on said carriage and rotatable about the workpiece,
a rotatable cutting element movable into and out of cutting position,
electric motor means operable to rotate said cutting element,
fluid operable means to move said cutting element into and out of its cutting position,
fluid supply means including a fluid reservoir and an operable fluid compressor means to supply fluid to said fluid operable means to operate the same,
said cutting element, electrical motor, fluid operable means, and fluid supply means being on said support means and rotatable about the workpiece to be cut and being on said carriage for reversible movement therewith along said track,
a non-rotating source of electricity on said apparatus,
and electric transmitting means between said source of electricity and said electric motor to transmit operating electricity thereto from said source while the same are rotated about the workpiece to be cut.

2. In a cutting apparatus as in claim 1,
a second workpiece cutting element movable into and out of cutting position,
second fluid operable means to move said second cutting element into and out of cutting position and connected with said fluid supply means to receiving operating fluid therefrom,
said second cutting element, fluid operable means and motor being on said support means and rotatable about the workpiece to be cut and being on said carriage for reversible movement therewith,
and a second electric motor operable to rotate said second cutting element and connected with said electric transmitting means to receive operating electricity therefrom while the same are rotating about the workpiece to be cut.

3. In a cutting apparatus as in claim 2,
holding means on said carriage for movement therewith and operable to hold the workpiece to be cut.

4. In a cutting apparatus as in claim 2,
one of said electrical motors operating said operable fluid compressor.

5. In a cutting apparatus as in claim 4,
one of said cutting elements being a radial saw and the other being a bevel shaped cutter.

6. In a cutting apparatus as in claim 2,
a drum rotatable on said carriage and reversibly movable therewith,
rotatable drive means between said carriage and drum to rotate said drum,
and said drum mounting said cutting elements, motors, fluid operable means and fluid supply means.

7. In an apparatus for cutting a workpiece as pipe or the like moving in the direction of its axis comprising a source of input electricity,
an operable cutting element,
means to supply fluid under pressure including a fluid reservoir,
a rotatable drum,
a fluid operable means on said drum operable in response to fluid under pressure to move said cutting element into and out of cutting engagement with the pipe to be cut,
said drum continuously rotatable about the workpiece and mounting for conjoint rotation therewith said operable cutting element and said means to supply fluid under pressure including said fluid reservoir,
electrically operable means on said drum to operate said pipe cutting element and said fluid supply means for the operation of said fluid operable means,
carriage means to move said drum with the pipe to be cut,
means between said carriage and drum to rotate said drum relative to said carriage and the pipe to be cut,
and electrical receiving means on said drum connecting said input source of electricity with said electrically operable means while said drum is rotating.

8. In a cutting apparatus as in claim 7,
means on said carriage to clamp the moving pipe for movement of said carriage and drum conjointly with and in the direction of the pipe,
said drum having an opening therein for receiving the pipe therethrough and for rotation thereabout.

9. In an apparatus as in claim 8,
said drum further mounting for conjoint rotation and movement therewith relative to the pipe to be cut a second pipe cutting element,
a second fluid operable means to move said second pipe cutting element into and out of cutting engagement with the pipe,
means connecting said second fluid operable means with said fluid supply and second electrically operable means to operate said second cutting means,
said second electrically operable means being connected with said input source of electricity through said electrical receiving means.

10. In an apparatus for cutting pipe and the like,
operable cutting means for cutting the pipe,
fluid operator means for moving the cutting means into and out of cutting engagement with the pipe,
operable fluid supply means for supplying fluid under pressure to said fluid operator means,
electrically operated means to operate the fluid supply means and said cutting means,
a source of electricity to operate said electrically operated means,
means continuously rotatable about the workpiece and mounting said cutting means, fluid operator means, fluid supply means and electrically operated means for continuous rotative movement about the pipe axis,
means reciprocating along the pipe axis and supporting said mounting means and related mounted means for reciprocation along the pipe axis,
said source of electricity including non-rotatable electrical input connections reciprocal with said mounting means, and rotatable electrical receiving connections on said mounting means for reciprocation therewith and continuous rotation about the pipe axis.

11. In a cutting apparatus as in claim 10,
said electrically operated means comprising two electric motors on said rotatable mounting means, one being connected with said fluid supply means to operate the same and the other being connected with said cutting means to operate the same,
and said electrical receiving connections connecting said electric motors with said electrical input connections to operate said motors from said source of electricity.

12. In a cutting apparatus as in claim 11,
said cutting means comprising a saw and a bevel cutter,
one of said electric motors operating one of said cutting means and said fluid supply means and the other of said electric motors operating the other of said cutting means.

13. In a cutting apparatus as in claim 12,
said fluid operator means including an electrically operated valve controlled fluid cylinder for each of said cutting means,
and said electrical receiving connections connecting each of said electrically operated valve controls with said electrical input connections to operate the same from said source of electricity.

14. In a cutting apparatus as in claim 11,
a carriage reciprocal along the pipe axis, said mounting means being a drum on said carriage for reciprocation therewith and rotation relative thereto,
drive means on said apparatus to rotate said drum,
and means on said apparatus to reciprocate said carriage along the pipe axis.

15. In the method of cutting pipe comprising
moving the pipe at a given rate of speed in the direction of its axis,
moving a cutter, a fluid operator, a reservoir, a compressor and a motor conjointly with the pipe and rotating the same conjointly about the pipe,
rotating the cutter independently of its rotation about the pipe and applying fluid pressure to the fluid operator from the reservoir to move the rotating cutter into cutting engagement with the outer surface of the pipe to be cut while resupplying fluid to and storing the same in the reservoir by the compressor and applying fluid to the fluid operator by way of the fluid reservoir to move the independently rotating cutter out of cutting engagement with the pipe after the pipe has been cut all while the same rotate conjointly about the pipe.

16. In a pipe cutting apparatus as in claim 15,
the steps of supplying electrical current from a stationary source to the electric motor while the same is rotating about and moving conjointly with the pipe.

17. The method of operating a pipe cutting apparatus having an operable cutter and actuatable fluid power operator means for moving the cutter into and out of cutting engagement with the pipe, the invention comprising
moving the pipe to be cut at a given rate of speed along the direction of its axis,
moving the operable cutter and fluid powered operator means conjointly with the pipe,
operating the cutter while rotating the same about the pipe,
actuating the fluid powered operator means with fluid from a fluid reservoir to move the operating cutter into cutting engagement with the pipe to cut the same peripherally to a desired extent while rotating the fluid powered operator and fluid reservoir conjointly with the cutter about the pipe and then moving the cutter out of engagement with the pipe by actuating the fluid powered operator means,
and charging a fluid to a reservoir from a fluid charger while rotating the fluid reservoir and charger about the pipe conjointly with the fluid powered operator and moving the same conjointly with the pipe in the direction of its axis.

18. The method as in claim 17 wherein the pipe cutting apparatus includes an operable saw and respective fluid powered operable means therefor, the invention comprising
cutting the pipe at an angle with the cutter to produce a bevel thereon,
operating the saw while rotating the same about the pipe and sequentially operating the respective fluid powered operating means with fluid from the fluid reservoir to move the saw into peripheral sawing engagement with the pipe to sever the same while the cutter produces the bevel thereon,
and moving the saw out of sawing engagement with the pipe after the cutter is moved out of engagement with the pipe.

* * * * *